United States Patent [19]

Dragner et al.

[11] Patent Number: 5,591,489
[45] Date of Patent: Jan. 7, 1997

[54] PROCESS FOR SURFACE SIZING PAPER OR PAPERBOARD

[75] Inventors: Louis R. Dragner; John P. Farewell, both of Rock Hill, S.C.

[73] Assignee: Sequa Chemicals, Inc., Chester, S.C.

[21] Appl. No.: 434,600

[22] Filed: May 4, 1995

[51] Int. Cl.$^6$ ............................... B05D 3/12; B05D 3/02
[52] U.S. Cl. ...................... 427/364; 427/391; 524/275; 524/276; 524/277; 524/475; 524/487
[58] Field of Search ..................... 427/364, 391; 524/276, 475, 275, 277, 487

[56] References Cited

U.S. PATENT DOCUMENTS

| | | | |
|---|---|---|---|
| 2,230,240 | 2/1941 | Gerhart | 260/78 |
| 2,583,274 | 1/1952 | Niles | 427/364 |
| 2,606,891 | 8/1952 | Rowland | 260/78.5 |
| 3,048,501 | 8/1962 | Miller et al. | 427/391 |
| 3,244,655 | 4/1966 | Sullivan et al. | 260/29.6 |
| 3,297,657 | 1/1967 | Gray et al. | 260/78.5 |
| 3,477,871 | 11/1969 | VanWestrenen | 427/391 |
| 4,061,833 | 12/1977 | Pelletier et al. | 427/391 |
| 4,151,143 | 4/1979 | Blank et al. | 260/26.9 RW |
| 4,258,104 | 3/1981 | Lee et al. | 427/391 |
| 4,279,964 | 7/1981 | Heller | 427/364 |
| 4,397,984 | 8/1983 | Wendel et al. | 427/391 |
| 4,410,673 | 10/1983 | Schulz et al. | 526/202 |
| 4,628,071 | 12/1986 | Morgan | 524/832 |
| 4,894,397 | 1/1990 | Morgan et al. | 523/201 |
| 4,916,171 | 4/1990 | Brown et al. | 523/161 |
| 5,081,166 | 1/1992 | Kiehlbauch et al. | 523/201 |
| 5,118,533 | 6/1992 | Saji et al. | 427/364 |
| 5,122,568 | 6/1992 | DePierne et al. | 524/824 |
| 5,139,614 | 8/1992 | DePierne et al. | 162/135 |
| 5,149,729 | 9/1992 | Englund | 524/366 |

FOREIGN PATENT DOCUMENTS 814528  6/1969  Canada .

OTHER PUBLICATIONS

Proverb et al., "New Polymers For Alkaline Papermaking: Improved Paper Surfaces Through Size Press Applications", 1992, pp. 256–274.

*Primary Examiner*—Shrive Beck
*Assistant Examiner*—Brian K. Talbot
*Attorney, Agent, or Firm*—Mitchell D. Bittman

[57] ABSTRACT

This invention provides a process for surface sizing paper or paperboard involving applying a surface sizing composition containing a mixture of starch and a surfactantless stable vinyl polymer microemulsion, followed by drying. The vinyl polymer microemulsion is prepared by emulsion polymerization of a styrene or styrene containing organic group with a $C_2$–$C_8$ acrylic or methacrylic ester utilizing as the sole emulsifying agent a low molecular weight alkali soluble, acid containing copolymer.

17 Claims, No Drawings

PROCESS FOR SURFACE SIZING PAPER OR PAPERBOARD

BACKGROUND

This invention relates to surface treatment of paper or paperboard, particularly additives applied to paper at the size press during paper manufacture. While the additives are generally referred to as paper sizes, their benefits are not strictly limited to imparting water resistance. They provide related benefits particularly enhanced printing by ink jet printers, photocopiers, and other means of reproducing images, commonly called "office printers".

Chemicals are added to paper at the dry end of the process of paper making by means of a size press or calendar boxes. These may be applied to paper that will subsequently be coated with a mineral coating, but are most important to performance of grades of paper that have no subsequent coating, because in those cases, the size pressing or calendar box treatments are the last treatments and must completely prepare the surface of the paper for its end uses. The most common additive applied at the dry end is starch, as a water solution of cooked starch, which may be from many vegetable sources, most commonly waxy maize or dent corn. A second important additive is often a resinous or polymeric material which imparts water resistance to the paper in addition to that imparted by wet end additives. This surface size is important in controlling and altering the surface of the paper so it is receptive to any of the many printing methods. It is particularly important to achieving a surface receptive to high resolution office printing such as ink jet and laser printer printing.

For many years the papermaker has had only a few types of size press sizes from which to choose. Ammonium salts of half esters of maleic acid copolymerized with styrene and salts of acrylic acid polymerized with styrene are two types commonly used. Emulsions of polyesters and polyurethanes are also sometimes used. These sizes have several general drawbacks to their use and each has specific detriments to the papermaking process. Some have negative features in the effect they have on the surface of the sheet. Styrene-based polymers are known to produce foam in the process equipment which creates deposit problems and may contribute to poor or erratic performance as a surface modifier. This is a serous deficiency in that chemical counter-measures are often self defeating: defoamers and anti-foams are often composed of surface active materials which cause the paper surface to be more easily wetted. Styrene-maleic and other film forming polymers are also reported to impede drying. Emulsions of polyesters or urethanes are easily destabilized by the high temperatures, hydrodynamic shear and conditions favoring evaporation usually found in starch-holding tanks. Efficiency of such emulsion sizes is generally conceded to decrease if the dispersed particles coagulate. More commonly, the ultimate particle size is quite large and the efficiency of the material as a surface treatment is low. Conversely, small diameter particles require large amounts of stabilizing agents which are usually wetting agents and foaming agents.

Solution polymers are more effective as sizing agents the higher their molecular weight. The most effective water soluble surface sizing polymers, therefore, form very viscous solutions. For this reason they are usually sold as dilute solutions of 10% top 20% solids content. The water present contributes substantially to the delivered cost of such polymers, thus a lower viscosity and higher solids would be desirable. High molecular weight also contributes to the foaming tendency of such polymers, and to the difficulty in removing deposits of such chemicals when they form in the papermaking system, at the high liquid level of size press feed tanks for example.

SUMMARY

Briefly, the present invention provides a process for surface sizing paper or paperboard. This process involves applying a surface sizing composition comprising a mixture of starch and a suffactantless stable microemulsion of a vinyl polymer prepared by emulsion polymerization of a styrene or styrene containing organic group with a $C_2$–$C_8$ acrylic or methacrylic ester which provides a Tg to the vinyl polymer of less than 50° C., utilizing as the sole emulsifying agent a dissolved alkali soluble, acid containing copolymer having a weight average molecular weight of from 4500 to 15,000, wherein the particle size of the microemulsion is 99% less than 0.3 microns diameter (measured by light scattering). The paper or paperboard is then dried. The preferred vinyl polymer is a copolymer of styrene, butyl acrylate and 2-ethyl hexyl acrylate and the preferred alkali soluble, acid containing copolymer is a copolymer of styrene and acrylic acid.

DETAILED DESCRIPTION

The surface sizing composition of this invention utilizes an alkali soluble, acid containing copolymer, preferably containing styrene and acrylic acid to emulsify the monomers of the vinyl polymer during emulsion polymerization. The alkali soluble acid containing copolymer replaces the use of a conventional surfactant, such a nonionic, cationic or anionic compounds of low molecular weight. Examples of conventional surfactants are soaps, ethoxylated alkylphenols, sulfosuccinate compounds, sulfonated or phosphorated materials, and the like. Using an acrylic acid containing, alkali soluble copolymer as a macromolecular emulsifying agent without other surfactants enhances sizing efficiency. In addition, the surface sizing composition has excellent compatibility with starch at size press temperatures (120° F. to 160° F.). Eliminating the use of conventional surfactants when preparing the surface sizing composition avoids the problems normally associated with these conventional surfactant containing systems such as destabilization of the emulsion by migration of the conventional surfactant away from the emulsion particles, and re-wetting of the sized paper containing dried conventional surfactants on the surface.

The alkali soluble, acid containing copolymers are well known materials. They can be synthesized by a number of methods. The synthesis of especially useful alkali soluble, acid containing copolymers is described in Canadian Patent No. 814,528. Examples of alkali soluble, acid containing copolymers useful in this invention are: styrene-acrylic acid copolymers, styrene-methacrylic acid copolymers, styrene-acrylonitrile-acrylic acid copolymers, styrene-butyl acrylate-acrylic acid copolymers, and the like. Instead of styrene, other hydrophobic monomers may be contained in the acid containing copolymers, such as alpha-methylstyrene; alkyl substituted styrenes, such as vinyl toluene; acrylonitrile; vinyl chloride, acrylic- and methacrylic esters, such as butyl acrylate, methyl methacrylate; or the like, or mixtures thereof; vinyl esters, such as vinyl acetate or vinyl laurate; fumarate esters, such as dibutyl fumarate; maleate esters, such as dibutyl maleate; itaconate esters, such as dibutyl itaconate; olefins, such as ethylene, and the like, or mixtures thereof. Instead of acrylic- or methacrylic acid, other copolymerizable, unsaturated acids may be used in the synthesis of the alkali soluble, acid containing copolymers. Examples are: crotonic acid; itaconic acid; monoalkyl maleates, such as monoethyl maleate; acotinoc acid; and the like. Unsaturated sulfonic acids, such as vinyl sulfonic acid or styrene sulfonic acid and the like may also be used. The acid number of the alkali soluble, acid containing copolymers is at least 100 and generally from 100 to 400, preferably from 190 to 250. The weight average molecular weight of the alkali soluble, acid containing copolymer are generally from 4,500 to 15,000, preferably from about 5,000 to 10,000 Mw (weight average molecular weight). When a styrene-acrylic acid copolymer is used as the emulsifier in this invention the weight ratio of styrene to acrylic acid is generally from about 6:1 to about 1.5:1, preferably from about 5:1 to about 2.5:1. The alkali soluble, acid containing copolymer can be any of the commercially available products, such as Morez 101, sold by Morton Chemical Company, or Flexbond 25, sold by the Air Products Co., or Joncryl 67 sold by S. C. Johnson Company. Other commercially available alkali soluble, acid containing copolymers of above description and having properties similar to the ones mentioned above can also be used. Some of these commercial copolymers are available as aqueous solutions and can be used as such. If they are in a solid form they have to be dissolved in an alkaline medium at elevated temperature. Alkali compounds such as ammonium hydroxide, sodium hydroxide, potassium hydroxide, soda ash and the like, as well as watersoluble mono-, di- and trialkyl- or hydroxyalkyl amines, such as methyl or ethyl amine or monoethanol amine, may be employed to solubilize the alkali soluble, acid containing copolymer. In a preferred embodiment, the alkaline solution contains a nitrogen containing compound preferably comprising a major amount by weight of ammonia. The pH of the solution of the alkali soluble, acid containing copolymer is generally about from 6 to 10, preferably from about 7.5 to 9. The aqueous alkali soluble, acid containing copolymer solution generally has a solids level of from 20 to 40%.

The vinyl copolymer emulsion is prepared conventionally using normal emulsion polymerization techniques. These are well known in the art. The alkali soluble, acid containing copolymer is first dissolved in alkaline water, then a vinyl monomer is added, either batchwise, semi-continuously or continuously, and emulsion polymerized using conventional initiators. For example, an alkali persulfate, such as sodium-, ammonium-, or potassium persulfate; as well as hydroperoxides, such as cumene hydroperoxide or t-butyl hydroperoxide; or hydrogen peroxide, or mixtures thereof, may be used. Redox systems containing above recited peroxides in conjunction with small amounts of ferrous ions and a redox agent, such as sodium formaldehyde sulfoxylate or ascorbic acid are also often used in emulsion polymerizations. The polymerization is performed at a temperature of about 30° C. to about 100° C.

The vinyl polymer is prepared by emulsion polymerization or a styrene or styrene containing organic group with a $C_2$–$C_8$ acrylic or methacrylic ester which provide a Tg to the vinyl polymer of less than 50° C. The styrene or styrene containing organic group includes alpha-methylstyrene; alkyl substituted styrenes, such as vinyl toluene and para ethyl styrene. The $C_2$–$C_8$ acrylic- and methacrylic esters, includes butyl acrylate, 2-ethyl hexyl acrylate, methyl methacrylate, ethyl methacrylate, propyl methacrylate or butyl methacrylate, etcetera, or mixtures thereof. Preferably the $C_2$–$C_8$ acrylic- and methacrylic esters also include 2-ethylhexyl acrylate. Preferred levels of the monomer are 40 to 60 mole % of the styrene or styrene containing organic compound, 30 to 50 mole % of the acrylic or methacrylic ester and 5 to 20 mole % of 2-ethyl hexyl acrylate. Other compounds which can be added in minor amounts include vinyl esters, such as vinyl acetate or vinyl laurate; fumarate esters, such as dibutyl fumarate; maleate esters, such as dibutyl maleate; itaconate esters, such as dibutyl itaconate; olefins, such as ethylene. The vinyl copolymer can also contain any of the typical multi-olefinically unsaturated crosslinking monomers, such as triallyl cyanurate, pentaerythritol tetraacrylate, trimethylol propane triacrylate, divinyl benzene, alone or in combination. The Tg of the vinyl polymer is generally less than 50° C., preferably from −10° C. to 25° C., as calculated by the well known Fox equation. This Tg is important because it allows the polymer to soften and flow somewhat during drying.

No conventional surfactants should be used preparing the emulsion. The alkali soluble, acid containing copolymer is the sole emulsifier and protective colloid. The alkali soluble, acid containing copolymer is used in the amount of 10 to 50%, preferably in the amount of 20 to 40%, based on the weight of the monomers to prepare the vinyl polymer or copolymer emulsion with the vinyl polymer comprising 50 to 90%, preferably 60 to 80% of the emulsion. The particle size of the microemulsion of the vinyl polymer or copolymer is generally 99% less than 0.3 microns (as measured by light scattering), preferably 99% less than 0.1 microns and optimally with 99% less than 0.08 microns (80 nanometers). The viscosity of the vinyl polymer or copolymer emulsion is from about 20 to 800 centipoise, preferably from about 40 to 300 centipoise when measured at 41% solids at 25° C. and at 50 rpm. The solids of the vinyl polymer or copolymer emulsion is generally from 30 to 60%, preferably from 40 to 50%. The pH of the vinyl polymer or copolymer emulsion is from 7 to 10, preferably from 8 to 9. The surfactantless aqueous microemulsion of vinyl polymer is mixed with starch at a solids by weight ratio of vinyl polymer microemulsion to starch of 1:10 to 1:80.

In a preferred embodiment the microemulsion vinyl polymer contains a copolymer of styrene, butyl acrylate and 2-ethyl hexyl acrylate and as an emulsifier, a styrene-acrylic acid copolymer. The monomer weight ratio of styrene to butyl acrylate to 2-ethyl hexyl acrylate in the preferred vinyl copolymer emulsion is about 5:4:1. Generally, the pH of the sizing composition will be alkaline, preferably at a pH of 7–10 to maintain the alkali soluble, acid containing copolymer in solution. Advantageously, high solids levels of the sizing composition can be achieved of up to about 60%, preferably 40% to 50%.

The paper size of the invention is useful as enhancers for office printing when applied to paper. These sizes are produced by a process that does not require the addition or distillation of a non-aqueous solvent. The sizes are stable under long term storage and are pumpable and freeze-thaw stable even at solids content which substantially exceed the concentrations of certain conventional sizes. This invention is unique in that it generates virtually no stable foam in process equipment, even when mixed with starch solutions at a high temperature. An outstanding benefit, beyond the substantial water resistance imparted to paper treated according to this invention, is that it enhances the printability of paper printed by modem ink jet methods while allowing permanent photocopies which have excellent copy toner adhesion.

The following examples are set forth for the purposes of illustrating the invention and are not to be construed as limitations except as set forth in the appended claims.

EXAMPLE I

Paper is made on a pilot paper machine run without any size press additives and without calendaring. To a fiber furnish of refined 50/50 Northern softwood/hardwood is added 8% (160 lbs. per ton of product) precipitated calcium carbonate. When the machine stabilizes, a pre-dispersed alkyl ketene dimer (AKD) wet end size is added in sufficient quantity to give off machine sizing of 20 seconds as measured by standard method. Basis weight of the paper manufactured is 47 lbs./3000 square feet. The conditions are held constant and a quantity of paper made. The paper is sheeted from the rolls thereby produced to a size convenient for laboratory padding. The aged sizing of the paper is 32 seconds to 46 seconds.

EXAMPLE II

A paper size is made in the laboratory as follows. A three liter stainless steel reactor with a cleaned glass lid with 3 or 4 ports is clamped to the reactor body. The lid is fitted with a condenser, temperature probe and infusion port, in addition to an agitator in a center port. To the reactor added 1010 grams of de-ionized water (DIw), 89 grams of 28% aqueous ammonia, 235 grams of flakes of styrene/acrylic acid polymeric dispersant of 5200 daltons molecular weight (commercially available as Morez 101 from Morton Chemical Co.) and 0.6 grams of a 5% solution of ferrous sulfate. The reactor is agitated with two, four prong, impeller-type blades while heating to 50° C. Mixing continues until the dispersant is dissolved. The pH is adjusted to 8.6 with aqueous ammonia, a nitrogen sparge is started and the reactor heated to 81° C.

While the reactor is heating, monomer mix and initiator are prepared. Into a one liter Erlenmeyer flask there is weighted 325.5 grams of styrene, 320.5 grams of n-butyl acrylate (nBuAcr) and 115.1 grams of 2-ethyl hexyl acrylate (2-EHA). This forms a clear liquid mixture containing 3.125 mole of styrene; the ratio of styrene to butyl acrylate is 5:4 and to the 2-EHA is 5:1. An initial catalyst is formed by mixing 4.00 grams of ammonium persulfate and 0.2 grams of 28% ammonia in 14 grams of DIw. Delayed initiator is prepared by mixing 4.25 grams of ammonium persulfate with 13.75 grams of ammonium persulfate in 71.3 grams of DIw.

When the reactor is at 81° C., 40 grams of the monomer mix and the initial catalyst are added. A rapid rise in temperature is observed indicating the initiation of reaction. An automatic temperature controller is activated, set to hold the reaction at 83+/–2° C. and additional monomer and initiator are continuously added to the reactor via positive displacement pumps at a rate such that at the end of two hours there has been added 2.5 moles of styrene, 2.0 moles of BuAcr and 0.5 moles of 2-EHA and 72.0 milliliters of the initiator solution. This period of delayed, gradual addition of the major share of monomer is referred to as the "delay" period and the additions as the "delays".

After the delays are finished, 1 gram of 40% aqueous t-butyl peroxide, 0.36 grams of sodium formaldehyde sulfoxylate and 4 drops of ammonia are dissolved in 10.2 grams of water and mixed into the polymer dispersion to accelerate reaction of any small amount of residual monomer, during a final holding period of one hour at 82° C. The reactor is then cooled to a maximum final temperature of 50° C. and the product removed. Gas chromatographic analysis of the final product reveals that 0.0115% monomer based on the total emulsion weight remains. This is 0.242 grams of monomer, or less than 0.04% of the total monomer added. The product polymer emulsion of 41% solids has a particle size of 65 nanometers. The Brookfield viscosity of the undiluted product cooled to room temperature is 92 cps. Grit content is estimated by filtering a quantity of polymer dispersion through a 325 mesh screen and weighing any retained residue. Grit content is found to be 36 ppm based on total dispersion weight. This is considered to be an extremely clean reaction, one with minimal wasted reactants, compared to others of the same type.

EXAMPLE III

A reaction is run as in Example I. During the delays samples are periodically withdrawn from the reactor and the particle size is measured by light scattering. The particle size is observed to slowly increase from 50 nanometers to 68 nanometers. Since the amount of monomer added by the end of the delay part of the reaction is fifteen times the amount present at the start, the reaction is concluded to have accommodated the added monomer primarily by an increase in the number of particles, and to only a very minor extent through growth of the particles. The product is thus an emulsion homopolymer and not a core-shell or interpenetrating network latex. The product is a microemulsion since the particles are less than one-tenth of a micron (100 nanometers) in diameter. The final residual monomer is 0.21% by a gas chromatography method showing that the monomer has reacted. The residual monomer after reaction with the t-butyl peroxide finishing initiator and 24 hour storage at room temperature is 0.021%.

EXAMPLE IV

A quantity of acid thinned, waxy corn starch (Staytape 44 sold by A.E. Staley Mfg. Co., Decatur. Ill.) is cooked at 95° C. in DIw and cooled. To an aliquot of the starch is added a portion of the product in Example II sufficient to give a starch-to-size ratio of 40:2 by weight and the mixture stirred by hand. A slip of paper from a stock of that made in Example I is affixed to a glass microscope slide to keep it flat. The amount of solution necessary to add to the surface of the paper to give a starch level of 40 lb./ton is calculated. That amount of the mixture is then spread uniformly on the surface of the anchored paper and dried at 105° C. for one minute. The slide is then cooled. A drop of distilled water is placed on the sized surface. The contact angle of the drop ten seconds after application to the surface is 90+/–1° when measured using a contact angle goniometer. The ten second contact angle on a surface of paper sized with a commercially feasible amount (1.6 lb./ton) of a styrene/maleic acid half amide, half butyl ester size is also 90+/–1°. The contact angle of water on a surface treated with only starch is 39+/–4°, showing that the polymeric sizes both increase the hydrophobicity of the paper surface and are equivalent in the degree of sizing produced.

EXAMPLE V

A pilot papermachine run is conducted as in Example I. In this trial, wet end size is kept constant at 2.5 lbs. of alkyl ketene dimer per ton. The paper is dried prior to the size press, and in this trial the size press is operated as is the after-size driers. Hydroxyethylated, acid thinned starch (Penford Gum 260) is cooked and pumped to the size press nip and applied to the paper thereby. Pickup is 6% (120 lbs/ton) of starch per ton of base paper, calculated from the draw-down rate in the feed tank of the size press. The paper produced is collected on marked reels after drying and calendaring. In a second part of this pilot paper machine run wet end conditions are kept constant, and a sufficient amount of the size made in Example II is added to the starch solution so the starch: size ratio of 80:3.5. No foaming of the size press solution, in the nip or in the feed tank, is observed. Paper made in the second part of the trial, therefore, is identical in composition to that in the first part with the addition of 4.75 lbs of the size from Example II. In a third part of the pilot machine run conditions are kept the same as in the first part, except a styrene/maleic half-amide, half ester size (SMA) is added to the starch. Under the mild shear conditions around the pilot size press the SMA polymer is observed to cause foaming in the nip which persists in the feed tank, which reduces starch pickup to 85 lbs/ton with concomitant size addition of only 1.3 lbs./ton.

The paper from each part of the trial is tested for contact angle and ink penetration with the following results:

| Starch Pickup | Size | Contact Angle (deg) | Penetration Time (sec) |
|---|---|---|---|
| 120 lb. starch | no size | 42° | 18 |
| 120 lb. starch | Example II | 91° | 534 |
| 85 lb. starch | SMA | 90° | 218 |

This example illustrates the effectiveness of the paper size of Example II under dynamic conditions compared to only starch at the size press. This also shows that the size in Example II is of efficiency equivalent or better than the SMA polymer, a commercially useful product. The size of this invention does not foam, and in this characteristic it is superior to the SMA.

EXAMPLE VI

This example illustrates laboratory tub sizing of the alkaline base paper prepared in Example I to simulate size pressing. This produces quantities of paper necessary to test printing and other important properties on standard 8½"×11" sheets. 220 grams of acid thinned hydroxyethylated dent corn starch (Penford Gum 280 available from Penford Products, Cedar Rapids, Iowa) is stirred into 780 grams of DIw, and cooked at 95° C. for 20 minutes to form a clear paste of 20.0% oven dry solids. To 350.4 grams of this solution are added 6.26 grams of a 42% solids dispersion prepared as in Example II and 497.7 grams additional heated DIw to give a 8.5% solids size press solution, the temperature of which is kept at 140° F. in a heated water bath. A quantity of the solution is poured into a preheated half-cylinder padding trough and kept at 130° F. by replenishing and heating with immersion heaters. Sheets of the paper made in Example I are trimmed to size, passed through the sizing bath and pressed between two rollers of a textile padder to give saturated sheets which have picked up 80 lb. of starch per ton of paper, i.e. 4% starch based on paper. In this example, that level of pickup corresponds also to 3.0 lbs. of sizing polymer per ton or 0.15% of the paper weight. Those familiar with the art will realize that adjustments may be necessary to the solids content and/or temperature of the padding bath, the speed and duration of exposure in the trough and other variables to obtain useful, flat paper sheets of the desired pickup. The sheets are dried in forced air at 255° F. (124° C.). The flat, white sheets so obtained are calendared at 600 pli at 30° C. to give a weight/caliper relation similar to commercial office papers. Sheets may then be precision trimmed to commercial size, 8½ inches by 11 inches for printing tests. Other tests do no require precision trimming of the sheets and samples of a geometry suitable, for e.g. contact angle testing, may be exactly or approximately cut.

EXAMPLE VII

To 350.4 grams of the starch solution prepared as in Example VI is added 13.68 grams of a 10% aqueous solution of a copolymer of styrene with the half amide, half butyl ester of maleic acid "SMAE" size. The alkaline base paper of Example I is tub sized in a manner identical to Example VI using the SMAE size solution. The paper is dried, calendared and trimmed like the paper in Example VI.

EXAMPLE VIII

Paper is tub sized as in Example VI using 13.7 grams of a 10% solution of styrene-acrylic acid size "SAA" size is added to the starch. The paper is dried, calendared and trimmed.

EXAMPLE IX

Paper is tub sized as in Example VI using 5.71 grams of a 45% dispersion of a stearyl alcohol adduct of trimethyl hexamethylol melamine, "SAM" size. The paper is dried, calendared and trimmed.

EXAMPLE X

Sheets treated as in Example VI, VII, VIII and IX trimmed to the standard 8½ inches by 11 inches are fed into a Hewlett Packard 560C ink jet printer and printed in accordance with Hewlett Packard Standard Paper Acceptance Criteria, Second Edition (Jul. 1, 1994) for evaluation of drying time, color ink and black ink performance. Other sheets are printed on a Xerox photocopier Model 5365 and tested for toner adhesion and cracking. Still other sheets are subjected to ink penetration, contact angle and friction slide angle test. Results are given in the table below. This example illustrates the effectiveness of the current invention in ink jet printing.

| Size | Color Bleed* | Drying Time Seconds | Black Ink Wicking* | Toner Adhesion Percent | Toner Crack Width | Contact Angle, Degrees | Penetration Time, seconds |
|---|---|---|---|---|---|---|---|
| Example II | 8 | 1 | 8 | 98 | 1.0 | 86 | 123 |
| SMAE | 6 | 18 | 7 | 93 | 1.21 | 98 | 164 |
| SAA | 6 | 12 | 6 | 92 | 1.1 | 93 | 144 |

| Size | Color Bleed* | Drying Time Seconds | Black Ink Wicking* | Toner Adhesion Percent | Toner Crack Width | Contact Angle, Degrees | Penetration Time, seconds |
|---|---|---|---|---|---|---|---|
| SAM | 4 | 8 | 8 | 85 | — | 87 | 132 |

*These tests are compared visually under 5% magnification to test standard and then are rated on a scale with 1 = very poor and 10 = best possible.

EXAMPLE XI

Paper is sized as in Example VI, using 8.76 grams of the size in Example II is added to the starch. Size pickup is 4.2 lbs. per ton of paper; starch pickup is 80 lbs. per ton. The sheets are dried and calendared.

EXAMPLE XII

Paper is sized as in Example VI, using 15.5 grams of a 15% solution of the polymeric styrene/acrylic dispersant in Example II is added to the starch. The pickup of the dispersant is 1.12 lbs. per ton of paper; this is the amount of dispersant used to prepare the 4.2 lb. of size applied to similar base stock in Example XI. The sheets are dried and calendared.

EXAMPLE XIII

Paper from Examples XII and XI is tested for ink penetration and contact angle with the following results:

|  | Ink Penet. Time | Contact Angle |
|---|---|---|
| 4.2 lb. (0.21%) Example II Size | 168 sec. | 86° |
| 1.12 lb. (0.056%) Dispersant Only | 48 sec. | 64° |

This data shows that the properties of the size emulsion is far above that which might be contributed by the dispersant present, the amount used in the preparation of Example II.

EXAMPLE XIV

The following test illustrates that this invention has far less foaming tendency that commercial SMAE and styrene/acrylic acid (SAA) size press additives. 150 grams of a 10% solution of a commercial styrene/maleic ester paper size, 150 grams of a 10% solution of a commercial SAA size and a 10% hand mixed solution of the product of Example II were each added to the cup of a bench-top blender (Waring Blendor Model 33BL). Each sample was agitated at the same high speed for 5 minutes and then poured into a 500 cc graduated cylinder. The height of foam was measured over a period of 3 hours. The same experiment was repeated using 1% dilutions of the three size press additives. The results were:

| Size | Foam Volumes | | |
|---|---|---|---|
|  | One-Half Hour | Two Hours | Three Hours |
| 10% SMAE | 60 | 50 | 50 |
| 10% SAA | 40 | 0 | 0 |
| 10% Example II | 10 | 0 | 0 |
| 1% SMAE | 30 | 0 | 0 |
| 1% SAA | 160 | 140 | 100 |
| 1% Example II | 0 | 0 | 0 |

This shows the superior foaming characteristics of this invention, as well as illustrating how persistent and troublesome foaming may be in the case of other prior art paper sizes.

EXAMPLE XV

A foaming test, similar to Example XIV but intended to measure foaming under conditions favoring air entrainment was done. In this test an amount of each fluid weighing 250 grams is placed in the bowl of a commercial kitchen mixer (Hobart Model N50) and stirred at high speed for 60 seconds with a wire whisk. The fluid and the foam produced are then poured into a 2 liter graduated cylinder and the foam height monitored. The product of Example II was compared to commercial SMAE size. The test solution consisted in each case of a predetermined weight of size dissolved in 250 cc of 8% solution of cooked starch at pH 8. The temperature was 130° F. at the start of the test. The results show the excellent handling characteristics of our invention when agitated in solution together with starch, in much the same way as it is in the feed system of a size press.

| Size (in starch) | Foam Volumes | |
|---|---|---|
|  | One-Half Hour | Two Hours |
| 0.40% SMAE | 130 | 110 |
| 0.15% SMAE | 130 | 80 |
| 1.0% Example II | 0 | 0 |
| 0.4% Example III | 0 | 0 |
| 0.15% Example II | 0 | 0 |

What is claimed is:

1. A process for enhancing the printability of a paper or paperboard for ink jet printing comprising:

applying a surface sizing composition to the paper or paperboard surface to enhance ink jet printability, said composition comprising a mixture of starch and a surfactantless stable microemulsion of a vinyl polymer prepared by emulsion copolymerization of a styrens or styrene containing organic group with a $C_2$–$C_8$ acrylic or methacrylic ester which provides a Tg to the vinyl polymer of less than 50° C., with a dissolved alkali soluble, acid containing copolymer having a weight average molecular weight of from 4500 to 15,000 as a sole emulsifying agent, wherein the microemulsion has a particle size of 99% less than 0.3 microns diameter; and drying the surface sizing composition.

2. Process of claim 1 wherein the microemulsion contains 50% to 90% by weight of the vinyl polymer and 50% to 10% by weight of the alkali-soluble acid containing copolymer.

3. Process of claim 2 wherein the alkali-soluble acid containing copolymer is a copolymer of styrene and acrylic acid having a monomer weight ratio from 6:1 to 1.5:1.

4. Process of claim 3 wherein the vinyl polymer comprises 40 to 60 mole % of the styrene or styrene containing organic group, 30 to 50 mole % of the acrylic or methacrylic ester and 5 to 20 mole % of 2-ethyl hexyl acrylate.

5. Process of claim 4 wherein the vinyl polymer is a copolymer of styrene, butyl acrylate and 2-ethyl hexyl acrylate.

6. Process of claim 4 wherein the vinyl polymer further comprises a crosslinking monomer.

7. Process of claim 4 wherein the alkali soluble, acid containing copolymer has a weight average molecular weight of from about 5000 to 10,000.

8. Process of claim 7 wherein the microemulsion of vinyl polymer has a particle size of 99% less than 0.1 microns.

9. Process of claim 8 wherein the surface sizing composition comprises a solids weight ratio of vinyl polymer microemulsion to starch of between 1:10 to 1:80.

10. Process of claim 1 wherein a alkali compound is used to maintain a pH effective to dissolve the alkali-soluble, acid containing copolymer.

11. Process of claim 10 wherein the sizing composition has a pH of 7–10.

12. Process of claim 9 wherein the microemulsion has a solids level of from 30 to 60%.

13. Process of claim 12 wherein the viscosity of the microemulsion is from 20 to 800 centipoise when measured at 41% solids at 25° C. and at 50 rpm.

14. Process of claim 4 wherein the Tg of the vinyl polymer is from –10° C. to 25° C.

15. Process of claim 4 wherein the styrene containing organic group is selected from the group consisting of styrene, alpha-methyl styrene and alkyl substituted styrene.

16. Process of claim 4 wherein the acrylic or methacrylic ester is selected from the group consisting of butyl acrylate, methyl methacrylate, ethyl methacrylate, propyl methacrylate, butyl methacrylate and mixtures thereof.

17. Process of claim 13 wherein the viscosity of the microemulsion is from 40 to 300 centipoise when measured at 41% solids at 25° C. and at 50 rpm.

* * * * *